United States Patent
Pifer et al.

(10) Patent No.: US 8,212,405 B2
(45) Date of Patent: Jul. 3, 2012

(54) METERING ASSEMBLY AND CUSTOMER LOAD PANEL FOR POWER DELIVERY

(75) Inventors: John S. Pifer, Easton, CT (US); Andrew J. Edwards, Redding, CT (US)

(73) Assignee: OfficePower, Inc., Norwalk, CT (US)

( * ) Notice: Subject to any disclaimer, the term of this patent is extended or adjusted under 35 U.S.C. 154(b) by 464 days.

(21) Appl. No.: 11/950,601

(22) Filed: Dec. 5, 2007

(65) Prior Publication Data
US 2009/0150100 A1 Jun. 11, 2009

(51) Int. Cl.
*H02J 1/00* (2006.01)
*H02J 3/00* (2006.01)

(52) U.S. Cl. ............... 307/70; 307/80; 307/81; 307/85; 307/86; 307/87; 340/286.01; 340/870.02

(58) Field of Classification Search .................. None
See application file for complete search history.

(56) References Cited

U.S. PATENT DOCUMENTS

| | | | | |
|---|---|---|---|---|
| 4,114,141 A * | 9/1978 | Travis | ........................ | 340/10.41 |
| 4,204,195 A * | 5/1980 | Bogacki | ................... | 340/870.03 |
| 4,217,646 A * | 8/1980 | Caltagirone et al. | .......... | 700/296 |
| 4,302,750 A * | 11/1981 | Wadhwani et al. | ...... | 340/870.02 |
| 4,396,915 A * | 8/1983 | Farnsworth et al. | ..... | 340/870.03 |
| 4,672,227 A * | 6/1987 | Lagree et al. | .................... | 307/64 |
| 5,268,850 A * | 12/1993 | Skoglund | ...................... | 700/297 |
| 5,880,677 A * | 3/1999 | Lestician | ....................... | 340/3.1 |
| 6,198,176 B1 * | 3/2001 | Gillette | ............................ | 307/64 |
| 6,465,910 B2 * | 10/2002 | Young et al. | ................... | 307/64 |
| 6,583,521 B1 * | 6/2003 | Lagod et al. | .................... | 307/70 |
| 6,891,478 B2 * | 5/2005 | Gardner | ........................ | 340/635 |
| 6,949,843 B2 * | 9/2005 | Dubovsky | ....................... | 307/64 |
| 7,119,457 B1 * | 10/2006 | Flegel | ............................ | 307/64 |
| 7,208,850 B2 * | 4/2007 | Turner | ............................ | 307/64 |
| 2004/0124710 A1 * | 7/2004 | Pfeiffer | ........................... | 307/64 |
| 2006/0028069 A1 * | 2/2006 | Loucks et al. | ................ | 307/130 |
| 2006/0072262 A1 * | 4/2006 | Paik et al. | ....................... | 361/62 |
| 2007/0055409 A1 * | 3/2007 | Rasmussen et al. | .......... | 700/286 |
| 2008/0067871 A1 * | 3/2008 | Black et al. | .................... | 307/41 |

* cited by examiner

*Primary Examiner* — Rexford Barnie
*Assistant Examiner* — Justen Fauth
(74) *Attorney, Agent, or Firm* — Fiala & Weaver P.L.L.C.

(57) ABSTRACT

Methods, systems, and apparatuses for alternate power delivery are provided. A metering assembly includes a power meter module. The power meter module includes a power control module and a power monitor. The power control module is coupled to a transfer switch that receives both primary power and alternate power. The transfer switch has an output coupled to an electrical circuit load. The power control module is configured to receive a request from the transfer switch for the alternate power to be supplied through the transfer switch to the electrical circuit load. The power control module is configured to enable the transfer switch to supply the alternate power to the electrical circuit load in response to the request. The power monitor is configured to determine an amount of the alternate power provided to the electrical circuit load. The power control module is configured to enable the alternate power to be decoupled from the electrical circuit load if the determined amount of the alternate power provided to the electrical circuit load is greater than a power trip setpoint. A plurality of metering assemblies may be provided to monitor a corresponding number of transfer switches coupled to electrical circuit loads in a facility.

11 Claims, 9 Drawing Sheets

400

402
supply a first power to an electrical circuit load through a transfer switch that has a first input terminal coupled to a source of the first power and a second input terminal coupled to a source of an alternate power 404
receive a request for the alternate power to be supplied through the transfer switch to the electrical circuit load 406
generate the alternate power at the second source 408
enable the alternate power to be received by the electrical circuit load through the transfer switch

1502 — enabling an entity to input a power trip setpoint defining an allowable amount of power to be provided to the electrical circuit load by the alternate power source 1504 — determining whether an amount of the alternate power provided to the electrical circuit load is greater than the power trip setpoint 1506 — enabling a reduction in the power provided to the electrical circuit load by the alternate power source

FIG. 15

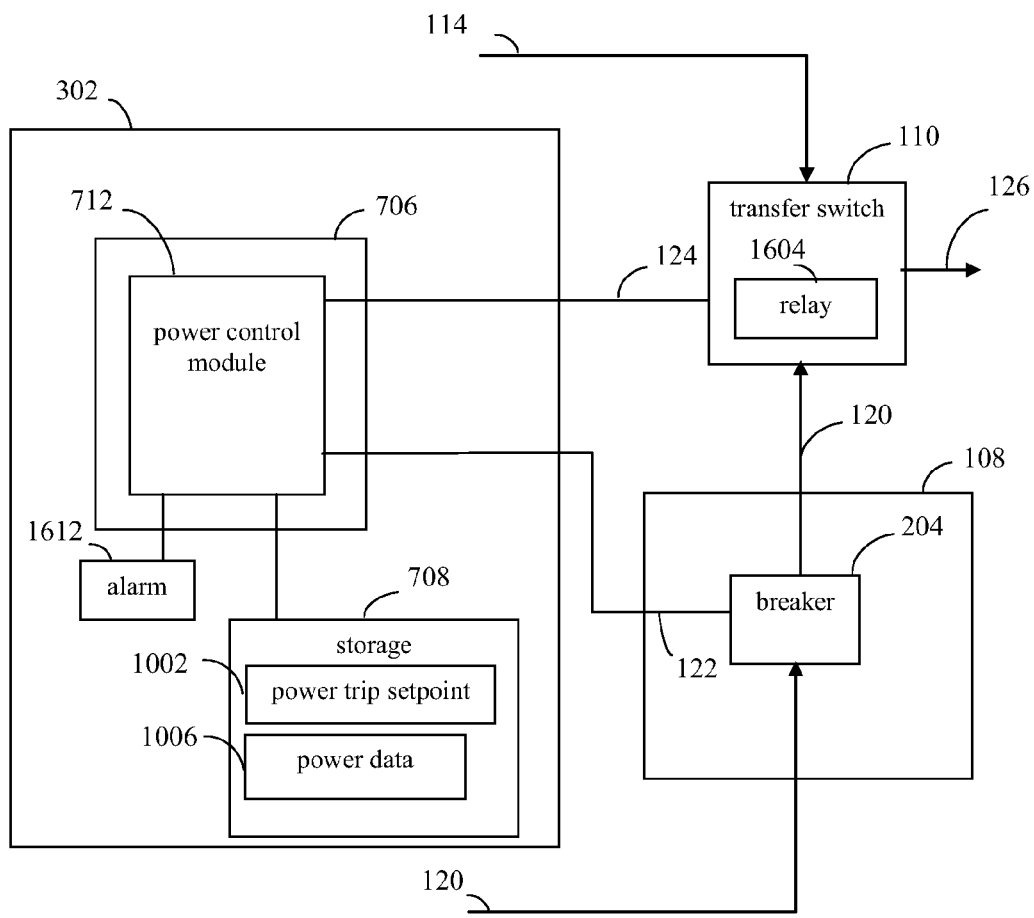

FIG. 16

METERING ASSEMBLY AND CUSTOMER LOAD PANEL FOR POWER DELIVERY

BACKGROUND OF THE INVENTION

1. Field of the Invention

The present invention relates generally to power delivery, and more particularly, to the control and monitoring of backup power delivered to one or more loads.

2. Background Art

Office building tenants are increasingly sensitive to the quality and reliability of their electric power. Many are expanding their investment in and reliance upon sophisticated computer and telecommunications equipment and networks that are increasingly vulnerable to grid-related power fluctuations and outages. To retain existing tenants and to attract new ones, office building owners need to establish a new standard of service that delivers power with reliability and quality that effectively addresses these growing concerns.

One approach for providing such a standard of service involves installing onsite power generation equipment for backup power. When power is lost from the electric utility that normally provides power, the onsite power generation equipment can be activated as a backup system to provide power to the office tenants during the outage. Such systems can provide an efficient way for office property owners to provide the power, reliability, and quality that will keep their facilities state-of-the-art and a step ahead of their competition.

However, onsite power generators have limited power generation capability as compared to electric utilities, and can fail when suddenly having to supply a heavy current load, such as when being powered up after the loss of the primary power source. Such limitations increase a difficulty in managing the delivery of power from backup sources during loss of primary power.

Thus, what is needed are improved ways of managing the loss of a primary power supply, including improved ways of managing the delivery of backup power from a relatively limited backup resource, and of avoiding failure of the backup power generators during power up and other situations.

BRIEF SUMMARY OF THE INVENTION

Methods, systems, and apparatuses for alternate power delivery are provided. A metering assembly is used to enable delivery of alternate power to an electrical circuit load during a primary power outage. Primary power and alternate (e.g., backup) power are received at a transfer switch at respective inputs. An output of the transfer switch is coupled to the electrical circuit load. During normal operation, the transfer switch supplies the primary power to the load. The metering assembly is coupled to the transfer switch, and enables the transfer switch to provide the alternate power to the load during a loss of the primary power.

In an example implementation, the metering assembly includes a power meter module. The power meter module includes a power control module and a power monitor. The power control module is coupled to the transfer switch. The power control module is configured to receive a request from the transfer switch for the alternate power to be supplied through the transfer switch to the electrical circuit load. The power control module is configured to enable the transfer switch to supply the alternate power to the electrical circuit load in response to the request.

In a further aspect, the power monitor is configured to determine an amount of the alternate power provided to the electrical circuit load through the transfer switch. The power control module is configured to enable the alternate power to be decoupled from the electrical circuit load if the determined amount of the alternate power provided to the electrical circuit load is greater than a power trip setpoint.

The metering assembly may include a user interface. The user interface may be configured to enable an operator of the metering assembly to input the power trip setpoint.

The metering assembly may include a communication interface configured to communicate with a supervisory entity. The supervisory entity may receive status and/or other information from the metering assembly. The supervisory entity may provide instructions and/or parameters to the metering assembly, such as the power trip setpoint.

In a further aspect, the supervisory entity may be communicatively coupled to a plurality of metering assemblies. Each metering assembly may be coupled to a transfer switch or a plurality of transfer switches. Each transfer switch receives the primary power and the alternate power at respective inputs. Each transfer switch has an output coupled to a corresponding electrical circuit load.

In an example aspect, the supervisory entity is configured to determine an order in which to enable the plurality of transfer switches to supply the alternate power to the plurality of electrical circuit loads in the event of loss of the primary power. The supervisory entity generates and provides timing information to each metering assembly. The power control module of each metering assembly transmits a signal to the respective transfer switch based on the received timing information to enable the alternate power to be supplied to the corresponding electrical circuit load according to the determined order.

In a further aspect, a customer load panel includes a plurality of circuit breakers coupled between a corresponding transfer switch and a source of the alternate power. Each metering assembly is coupled to a corresponding circuit breaker. Each metering assembly can cause the corresponding circuit breaker to open, to withhold the alternate power from the corresponding transfer switch and corresponding electrical circuit load.

In an example aspect, each electrical circuit load is distributed through a corresponding portion of a building or other structure. The source of the first power may be an electric utility or other primary power provider. The source of the alternate power may be located in the structure or other location suitable for alternate power. The metering assemblies may be positioned in any location, including being stored in one or more cabinets. The customer load panel may be positioned adjacent to the cabinet(s) or in any other location.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 4 shows a flowchart providing example steps for managing the distribution of power, according to example embodiments of the present invention.

FIG. 15 shows a flowchart for monitoring power consumption by an electrical circuit load, according to an example embodiment of the present invention.

FIG. 16 shows a power control module in a metering assembly for performing steps of the flowchart of FIG. 15, according to an embodiment of the present invention.

Figure 1:
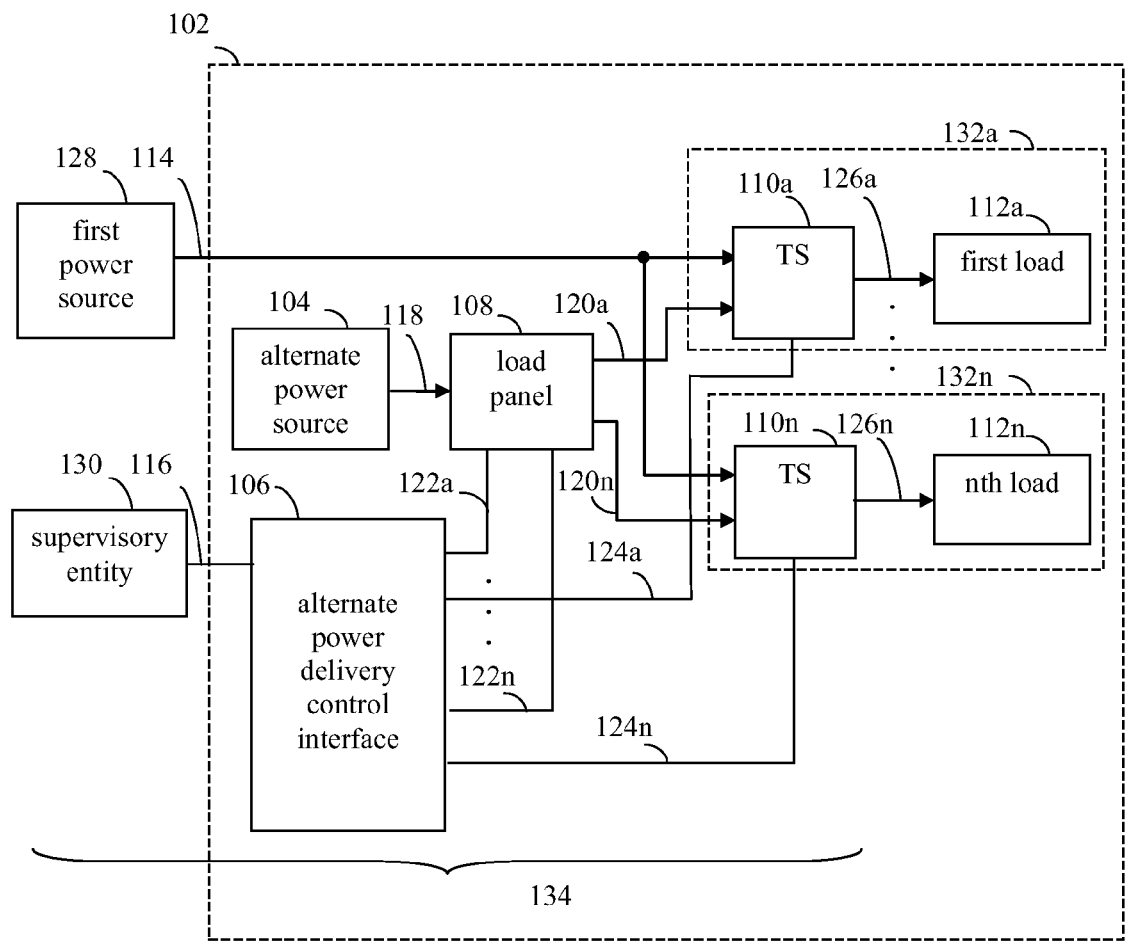
FIG. 1 shows a block diagram of a power delivery system, according to an example embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Example Embodiments

Methods, systems, and apparatuses are provided for power delivery in environments where a main power source and an alternate power source are available. For example, the alternate power source may be a backup power source to the main power source. Embodiments enable power to be supplied by the alternate power source to electrical circuit loads when desired, such as during a failure of the main power source. Furthermore, embodiments enable monitoring of supplied alternate power, sequencing of loads to receive alternate power, shedding of loads from alternate power, and/or other functions.

The example embodiments described herein are provided for illustrative purposes, and are not limiting. Further structural and operational embodiments, including modifications and/or alterations, will become apparent to persons skilled in the relevant art(s) from the teachings herein.

FIG. 1 shows a block diagram of a power delivery environment 100, according to an example embodiment of the present invention. Power delivery environment 100 includes a first power source 128 and an alternate power source 104. First power source 128 may be a primary source of power, while alternate power source 104 may be a backup source of power. An alternate power delivery system 134 in environment 100 manages delivery of power from alternate power source 104 to one or more electrical circuit loads 112 as an alternative to power delivered by first power source 128. For example, in an embodiment, first power source 128 may be an electric utility that engages in the distribution of electricity for sale. During a power outage, a lost or damaged power connection, or other cause for loss of power from first power source 128, backup power may be desired by electrical circuit load(s) 112. In such a situation, alternate power source 104 may be enabled by alternate power delivery system 134 to provide power to electrical circuit load(s) 112 to make up for the shortfall or total absence of power normally supplied by first power source 128.

First power source 128 generates a first power signal 114. First power signal 114 may be any type of power signal having any voltage level, as would be known to persons skilled in the relevant art(s). For example, first power signal 114 may be a 120 V, 208 V, 480 V, or other voltage level signal, and may be a direct current (DC) signal or an alternating current (AC) signal, such as a single phase, dual phase, or three phase power signal. During normal operation, first power signal 114 is received by electrical circuit loads 112 to provide power to electrical circuit loads 112.

When activated, alternate power source 104 generates an alternate power signal 118. Alternate power signal 118 is generated by alternate power source 104 to substantially match first power signal 114 in voltage, phase, and/or other attribute(s), to be acceptable for powering electrical circuit loads 112. Alternate power source 104 may include any number of one or more power generating elements to generate alternate power signal 118. For example, alternate power source 104 may include one or more power generating elements that use a fuel (e.g., natural gas, propane, diesel or kerosene) to generate energy (e.g., gas powered generators, etc.), that use solar radiation to generate energy (e.g., solar cells), and/or that generate energy in any other manner. In an embodiment, alternate power source 104 may include one or more (e.g., an array) microturbines that consume a fuel to generate power and/or heat. For example, microturbines distributed by Capstone Turbine Corporation, Chatsworth, Calif., such as C60 iCHP MicroTurbines, microturbines distributed by Elliott Energy Systems, Stuart, Fla., such as TA100-CHP microturbines, and/or other types of microturbines may be included in alternate power source 104 to generate power, in an embodiment.

Alternate power source 104 may be configured to generate enough electricity to meet any demand by electrical circuit loads 112, including 100% of the peak demand, or a percentage of the building's peak electrical demand, such as in the range of 25%-40% of the peak demand, or any other percentage.

As mentioned above, alternate power delivery system 134 manages delivery of power from alternate power source 104 as an alternative to first power source 128. As shown in FIG. 1, alternate power delivery system 134 includes an alternate power delivery control interface 106, a load panel 108, one or more transfer switches 110, and a supervisory entity 130. These elements of system 134 are described in detail as follows.

Transfer switches 110 switch power between sources 128 and 104 to electrical circuit loads 112. Any number of transfer switches 110 and corresponding electrical circuit loads 112 may be present. For example, FIG. 1 shows transfer switches 110a-110n electrically coupled to corresponding first-nth electrical circuit loads 112a-112n. For purposes of brevity, transfer switch 110a and first electrical circuit load 112a may be described in the following description. The description of transfer switch 110a and load 112a provided below is also generally applicable to transfer switches 110b-110n and electrical circuit loads 112b-112n.

Transfer switch 110a may be any type of switch suitable for switching between input power sources, such as an automatic transfer switch (ATS). Transfer switches 110 each include a first input terminal coupled to first power source 128, a second input terminal coupled to alternate power source 104 (through load panel 108), and an output terminal coupled to a corresponding electrical circuit load 112. Transfer switch 110a is shown in FIG. 1 as receiving first power signal 114 (at the first input terminal) from first power source 128, and receiving alternate power signal 118 (at the second input terminal as alternate power branch signal 120) from alternate power source 104 through load panel 108. Transfer switch 110a outputs a selected power signal 126a (from the output terminal) to electrical circuit load 112a, which is the one of first power signal 114 or alternate power signal 118 selected to provide power. During normal operation, the first input terminal of transfer switch 110a is internally coupled to the output terminal of transfer switch 110a to provide first power signal 114 to electrical circuit load 112 on selected power signal 126a.

Transfer switch 110a includes one or more communication terminals coupled to alternate power delivery control interface 106 by communication link 124. Transfer switch 110a includes a sensing circuit to detect when a failure of first power source 128 occurs. When such a failure is detected, an emergency mode may be entered, and logic of transfer switch 110a may transmit a request over communication link 124 to alternate power delivery control interface 106 for backup power. Alternate power delivery control interface 106 may transmit a signal on communication link 124a to transfer switch 110a to enable transfer switch 110a to switch from first power source 128 to alternate power source 104. Once enabled, the output terminal of transfer switch 110a is coupled to the second input terminal of transfer switch 110a, to supply alternate power branch signal 120 to electrical circuit load 112 on selected power signal 126a.

In an embodiment, transfer switch 110a is a "break before make" switch, breaking contact with one input terminal before making contact with the other, so that first power signal 114 and alternate power branch signal 120 are not coupled together at any time in transfer switch 110a. Any type and number of electrical connection mechanisms may be used to transmit power signals, such as first power signal 128, alternate power signal 118, alternate power branch signal(s) 120, and selected power signal(s) 126, including any type, gauge, and number of electrical wires/cabling, as would be known to persons skilled in the relevant art(s).

Alternate power delivery control interface 106 is coupled to transfer switches 110a-110n. Alternate power delivery control interface 106 is configured to perform various control functions, as well as various monitoring functions. For example, alternate power delivery control interface 106 is configured to perform some control functions with regard to transfer switches 110 and load panel 108. Furthermore, as described in detail further below, alternate power delivery control interface 106 may perform power monitoring functions, as well as status monitoring functions in some embodiments.

Alternate power delivery control interface 106 is coupled to each transfer switch 110 by a corresponding communication link 124. For example, as shown in FIG. 1, transfer switches 110a-110n are coupled to alternate power delivery control interface 106 by respective communication links 124a-124n. Alternate power delivery control interface 106 is coupled to load panel 108 by a communication link 122 corresponding to each transfer switch 110. For example, as shown in FIG. 1, alternate power delivery control interface 106 is coupled to load panel 108 by communication links 122a-122n, corresponding to transfer switches 110a-110n. Load panel 108 includes one or more circuit breakers controlled by alternate power delivery control interface 106 (using communication links 122) to interrupt a connection between alternate power source 104 and transfer switches 110, as desired.

Figure 2:
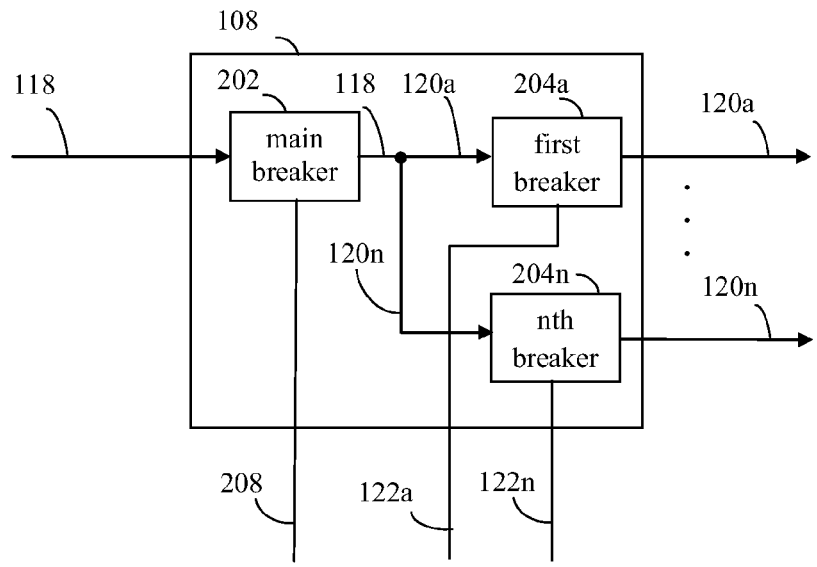
FIG. 2 shows a block diagram of a load panel, according to an example embodiment of the present invention.

For example, FIG. 2 shows a block diagram of load panel 108, according to an example embodiment of the present invention. As shown in FIG. 2, load panel 108 includes a main circuit breaker 202 and first-nth circuit breakers 204a-204n. Main circuit breaker 202 is positioned in series with alternate power signal 118, between alternate power source 104 and first-nth circuit breakers 204a-204n. Main circuit breaker 202 provides for overcurrent protection for the physical wires/cables providing alternate power signal 118 through load panel 108. Main circuit breaker 202 enables passage of alternate power signal 118 according to a main breaker control signal 208. In an embodiment, main breaker control signal 208 is received from supervisory entity 130. Supervisory entity 130 can open and close main circuit breaker 202 to respectively disconnect and connect alternate power signal 118 to first-nth circuit breakers 204a-204n.

Each of first-nth circuit breakers 204a-204n (also referred to as "branch breakers") of load panel 108 receives alternate power signal 118 through main circuit breaker 202. Each of first-nth circuit breakers 204a-204n enables passage of alternate power signal 118 as a respective one of alternate power branch signal 120a-120n according to control signals received on communication links 122a-122n from alternate power delivery control interface 106. Circuit breakers 204a-204n also provide for overcurrent protection to wires/cable of the respective one of alternate power branch signal 120a-120n.

Supervisory entity 130 may be present to perform a supervisory function for system 134. In an embodiment, supervisory entity 130 communicates with alternate power delivery control interface 106 over a communication link 116. Embodiments for supervisory entity 130 are described in further detail below.

Figure 3:
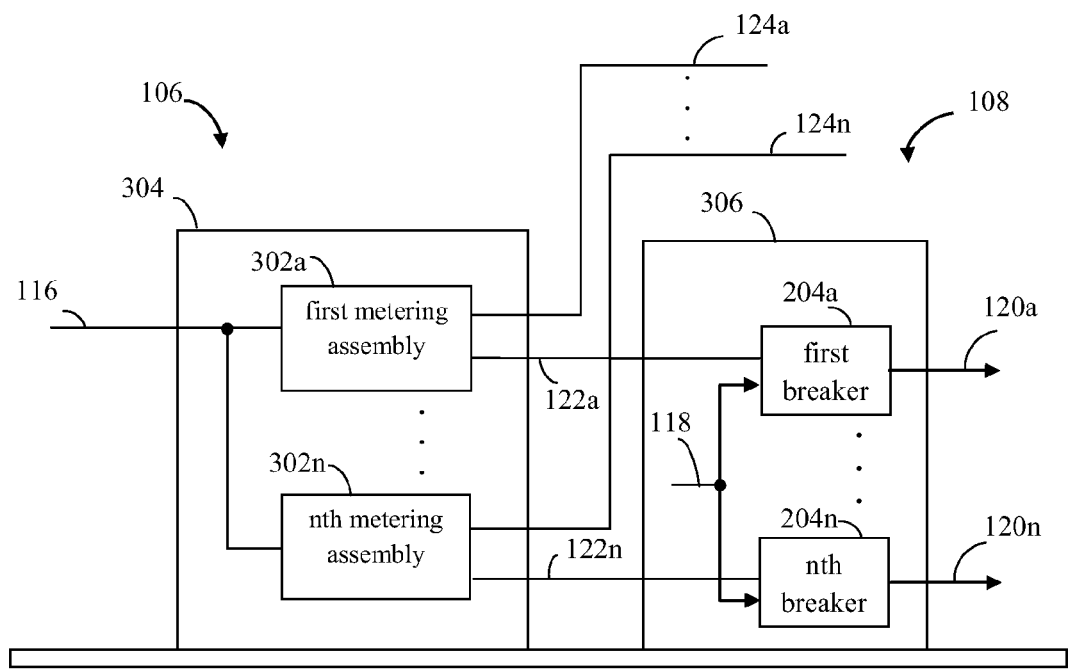
FIG. 3 shows an example of an alternate power delivery control interface and a load panel, according to an embodiment of the present invention.

Alternate power delivery control interface 106 may be configured in any way to perform its functions. For instance, FIG. 3 shows block diagram views of alternate power delivery control interface 106 and load panel 108, according to an example embodiment of the present invention. As shown in FIG. 3, alternate power delivery control interface 106 includes a first enclosure 304 and a plurality of metering assemblies 302. Metering assemblies 302 each perform control and/or monitoring functions of alternate power delivery control interface 106 with regard to a corresponding transfer switch 110.

First enclosure 304 may be one or more cabinets or other type of enclosure(s). Any number of metering assemblies 302 may be present, depending on the particular implementation. First-nth metering assemblies 302a-302n are shown in FIG. 3, for illustrative purposes. Each metering assembly 302 interfaces with a corresponding transfer switch 110 (not shown in FIG. 3). As shown in FIG. 3, each metering assembly 302 is coupled to communication link 116, for communications with supervisory entity 128. Furthermore, each metering assembly 302 is coupled to a respective transfer switch 110 by a corresponding communication link 124, and is coupled to a respective circuit breaker 204 by a corresponding communication link 122.

In FIG. 3, load panel 108 includes a second enclosure 306 that contains/mounts circuit breakers 204a-204n. Second enclosure 306 may be one or more cabinets or other type of enclosure(s). Although not shown in FIG. 3, main circuit breaker 202 may also be contained and/or mounted in second enclosure 306. Circuit breakers 204 (and main circuit breaker 202) may be mounted to a distribution panel board (not shown in FIG. 3) in second enclosure 306.

In an embodiment, first enclosure 304 and second enclosure 306 may be cabinets that are positioned side by side in an electrical room of a structure, such as a building. A manager/owner of first and second enclosures 304 and 306 may use metering assemblies 302 to distribute alternate power signal 118 to tenants and/or other occupants of the structure. For instance, metering assemblies 302 of first enclosure 304 monitor and control delivery of alternate power signal 118 passing through circuit breakers 202/204 of second enclosure 306. In an embodiment, each electrical circuit load 112 corresponds to a particular tenant of the structure. Each tenant may compensate the manager/owner of first and second enclosures 304 and 306 for the supplied alternate power, and may pay for a transfer switch 110, circuit breaker 204, metering assembly 302, and/or other component used to manage delivery of power to an electrical circuit load 112 of the tenant.

In the example embodiment of FIG. 1, alternate power source 104, alternate power delivery control interface 106, load panel 108, transfer switches 110a-110n, and electrical circuit loads 112a-112n are shown located in a structure 102, although one or more of the elements may be outside of structure 102 in alternative embodiments. Structure 102 may be a building, such as an office building, a factory, an apartment or condominium building, a governmental building, a commercial property, or other type of structure. As shown in FIG. 1, electrical circuit loads 112a-112n are present in respective portions 132a-132n of structure 102, which may each correspond to one or more rooms, offices, floors, etc., of structure 102. Each electrical circuit load 112 may include electrical wiring and electrical devices that require electrical power. Each electrical circuit load 112 may be distributed through the respective portion 132 of structure 102. In the embodiment of FIG. 1, each transfer switch 110 is positioned in the portion 132 of structure 102 covered by their respective electrical circuit load 112, although transfer switches 110 may be positioned elsewhere in other embodiments. Furthermore, in the embodiment of FIG. 1, supervisory entity 130 is shown to be positioned external to structure 102. Alternatively, supervisory entity 130 may be located in structure 102.

A metering assembly 302 may be configured in any manner to perform its functions within alternate power delivery system 134 of FIG. 1. FIG. 4 shows a flowchart 400 providing example steps for managing the distribution of power, according to example embodiments of the present invention. For example, alternate power delivery system 134 can be used to perform flowchart 400. Flowchart 400 is described as follows. Other structural and operational embodiments will be apparent to persons skilled in the relevant art(s) based on the following discussion.

Flowchart 400 begins with step 402. In step 402, a first power is supplied to an electrical circuit load through a transfer switch that has a first input terminal coupled to a source of the first power and a second input terminal coupled to a source of an alternate power. For example, during normal operation, transfer switch 110n supplies first power signal 114, received at a first input terminal of transfer switch 110n, to nth electrical circuit load 112n. Transfer switch 110n receives alternate power signal 118 at a second input terminal from alternate power source 104 (through load panel 108) as alternate power branch signal 120n.

In step 404, a request is received for the alternate power to be supplied through the transfer switch to the electrical circuit load. Referring to FIGS. 1 and 3, metering assembly 302n is coupled to transfer switch 110n by communication signal 124n. In an embodiment, transfer switch 110n may detect a loss of power on first power signal 114. As a result, transfer switch 110n may provide a request on communication signal 124n to metering assembly 302n for alternate power. In an embodiment, metering assembly 302n may forward the request to supervisory entity 130 over communication link 116.

In step 406, the alternate power is generated at the second source. Alternate power source 104 may already be activated and generating alternate power signal 118, or may be offline, and may thus need to be activated. In an embodiment, supervisory 130 may transmit an activation request signal to alternate power source 104 over a communication link (not shown in FIG. 1). In another embodiment, metering assembly 302n may transmit an activation request signal to alternate power source 104 over a communication link (not shown in FIGS. 1 and 3).

In step 408, the alternate power is enabled to be received by the electrical circuit load through the transfer switch. In an embodiment, after alternate power source 104 is activated, and is sufficiently ready to support a new electrical load, alternate power signal 118 is enabled to be received by electrical circuit load 112n through transfer switch 110n. For example, alternate power source 104 may communicate its readiness to supervisory entity 130 and/or metering assembly 302n. Metering assembly 302n may transmit an enable signal over communication link 124n to transfer switch 110n to enable the second input terminal of transfer switch 110n to be coupled to the output terminal of transfer switch 110n, to provide alternate power signal 118 to nth electrical circuit load 112n as selected power signal 126n.

Note that flowchart 400 is described above with respect to metering assembly 302n, for illustrative purposes, and that further metering assemblies 302 (e.g., metering assembly 302a, etc.) may be used to perform flowchart 400 with regard to their respective transfer switches 110 and electrical circuit loads 112. For example, multiple metering assemblies 302 may perform one or more steps of flowchart 400 in parallel due to a loss of first power signal 114. In embodiments, step 408 may be performed by the multiple metering assemblies 302 such that transfer switches 110 are enabled to provide power from alternate power source 104 in a serial manner or in parallel.

Figure 5:
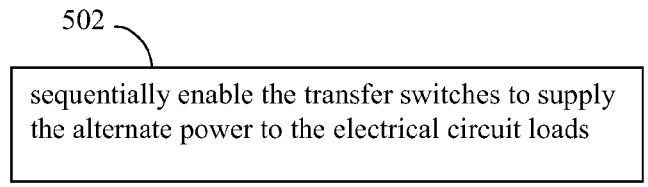
FIG. 5 show an example step for sequentially enabling transfer switches, according to an embodiment of the present invention.
Figure 6:
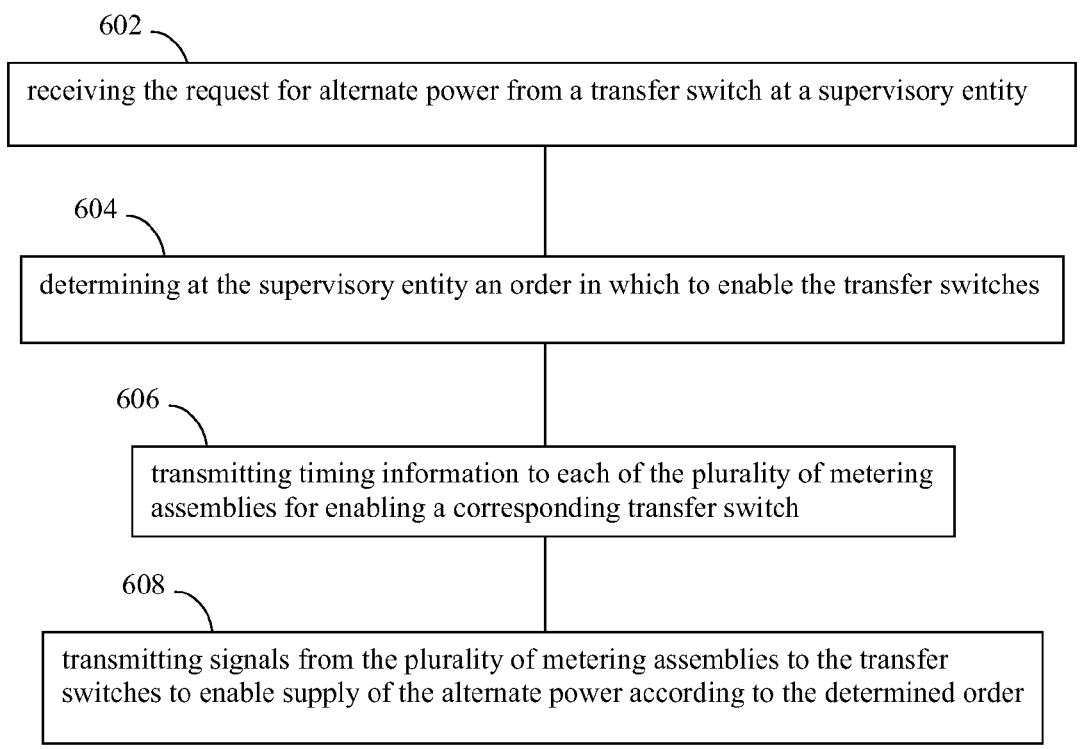
FIG. 6 shows a flowchart providing example steps for load sequencing, according to an embodiment of the present invention.

If power is enabled to be supplied through multiple transfer switches 110 simultaneously, this may potentially cause alternate power source 104 to fault off-line (e.g., due to a surge in required current). In an embodiment, step 408 may be performed according to a step 502 shown in FIG. 5. In step 502, the transfer switches are sequentially enabled to supply the alternate power to the electrical circuit loads. For example, referring to FIG. 1, rather than enabling transfer switches 110a-110n to supply alternate power simultaneously, rapidly placing a heavy load (e.g., electrical circuits 112a-112n) on alternate power source 104, the load is spread out over time by sequencing the enabling of transfer switches 110. In this manner, a failure of alternate power source 104 may be prevented. In an embodiment, such load sequencing may be performed according to flowchart 600 shown in FIG. 6. Flowchart 600 is described as follows with respect to FIGS. 1 and 3.

In step 602 of flowchart 600, the request for alternate power is received from a transfer switch at a supervisory entity. For example, transfer switch 110a may detect a loss of power on first power signal 114, and may transmit the request for alternate power. In an embodiment, the request for alternate power is received by a metering assembly 302a from transfer switch 110a on communication link 124a. Metering assembly 302a may forward the request to supervisory entity 130 on communication link 116. In another embodiment, supervisory entity 130 receives the request directly from transfer switch 110a.

In step 604, the supervisory entity determines an order in which to enable the transfer switches. Because first power signal 114 is lost, each electrical circuit load 112a-112n relying on first power signal 114 for power will need backup power. In an embodiment, supervisory entity 130 may store electrical starting requirements for each of electrical circuit loads 112a-112n, and may store power supply specification information of alternate power source 104, including a maximum power capability, and information indicating a capability of alternate power source 104 to respond to load increases. Supervisory entity 130 may determine a sequence for enabling electrical circuit loads 112a-112n, and time intervals between such enabling, based on the electrical starting requirements and specification information.

In step 606, timing information is transmitted to each of the plurality of metering assemblies for enabling a corresponding transfer switch. For example, in an embodiment, supervisory entity 130 may transmit timing information to each of metering assemblies 302a-302n that includes timing for each metering assembly 302 to enable the corresponding transfer switch 110.

In step 608, signals are transmitted from the plurality of metering assemblies to the transfer switches to enable supply of the alternate power according to the determined order. In an embodiment, metering assemblies 302a-302n each enable their corresponding one of transfer switches 110a-110n according to the timing information received from supervisory entity 130. For example, each metering assembly 302a-302n may receive a corresponding timing delay after which to enable a respective one of transfer switches 110a-110n.

Figure 7:
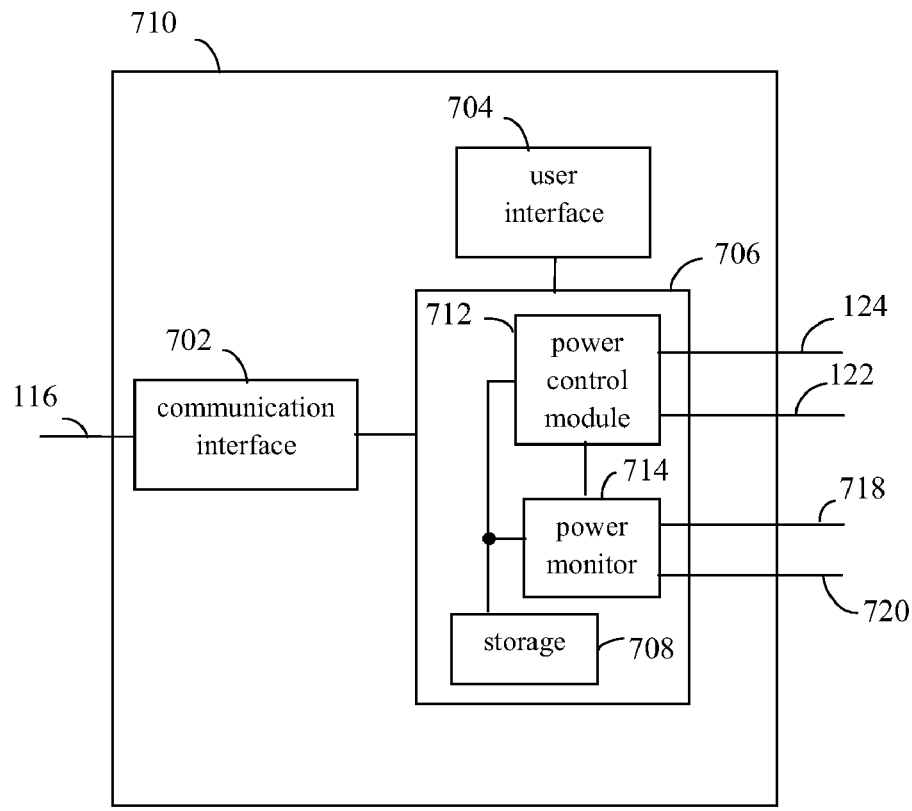
FIG. 7 shows a block diagram of a metering assembly, according to an example embodiment of the present invention.

Metering assemblies 302 can be configured in any manner to perform their functions. For instance, FIG. 7 shows a metering assembly 302, according to an example embodiment of the present invention. As shown in FIG. 7, metering assembly 302 includes a communication interface 702, a user interface 704, a power meter module 706, and a housing 710. Housing 710 contains communication interface 702 and power meter module 706. Although not shown in FIG. 7, housing 710 may also include one or more wiring terminal blocks used to terminate and/connect wiring internal to housing 710. User interface 704 may be mounted to a surface of housing 710, or at other externally or internally accessible location (e.g., accessible internal to housing 710 by opening a hinged cover, etc.), to enable an operator to interact with metering assembly 302. For example, housing 710 may be a container such as a metal box that mounts user interface 704 on an external surface. Housing 710 of metering assembly 302 may be shaped to enable a plurality of metering assemblies 302 to be stacked or otherwise positioned together in first enclosure 304 shown in FIG. 3.

In the embodiment of FIG. 7, power meter module 706 includes a power control module 712, a power monitor 714, and storage 708. Power control module 712 performs control functions for metering assembly 302, such as performing control functions with regard to a corresponding transfer switch 110 and a corresponding circuit breaker 204. For example, as shown in FIG. 7, power control module 712 communicates over communication link 124 to receive power requests from and to provide enable signals to a corresponding transfer switch 124. Power control module 712 communicates over communication link 122 to provide control signals to a corresponding circuit breaker 204.

Power monitor 714 performs monitoring functions for metering assembly 302. For example, power monitor 714 may monitor a power supplied by alternate power source 104 through the corresponding transfer switch 110. In some embodiments, power monitor 714 may perform status monitoring with regard to a corresponding transfer switch 110 and circuit breaker 204 using communication links 718 and 720, respectively.

Power control module 712 and power monitor 714 may be implemented in hardware, software, firmware, or any combination thereof. Storage 708 includes one or more storage devices (e.g., memory chips, hard disc drives, etc.) for storing information, including control data, status data, power data, and/or further types of information. In an embodiment, power meter module 706 may be a power meter or similar device.

Communication interface 702 provides a interface for metering assembly 302 to communicate with supervisory entity 130 over communication link 116. Communication link 116 can include any type of communication link, including a network such as a local area network (LAN), wide area network (WAN), or combination of networks such as the Internet. Communication link 116 can be a proprietary or industry standard communication link that is wired or wireless, and can support serial or parallel communications. Communication interface 702 may be configured for communications over communication link 116 according to any protocol, including Ethernet, a Wi-Fi protocol (e.g., IEEE WLAN 802.11), or other protocol as desired for a particular application. For example, in an embodiment, communication interface 702 may be configured to communicate with supervisory entity 130 according to the Modbus serial communications protocol, which is an industry standard, over communication link 116, which may be configured for RS-485 communications.

Figure 8:
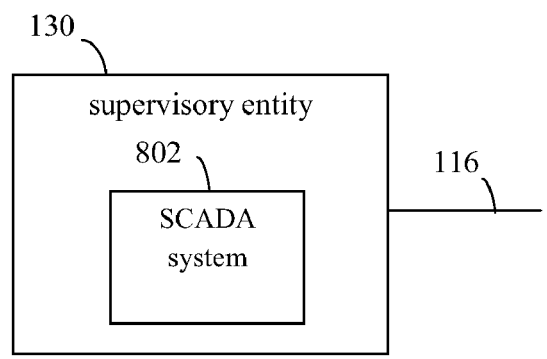
FIG. 8 shows a block diagram of a supervisory entity, according to an embodiment of the present invention.

Supervisory entity 130 may be any type of entity capable of performing command and control functions over metering assemblies 302. Supervisory entity 130 may be implemented in hardware, software, firmware, or any combination thereof. For example, in an embodiment, supervisory entity 130 may be implemented in a computer system having one or more processors that execute code that implements logic of supervisory entity 130. For example, FIG. 8 shows a block diagram of supervisory entity 130, according to an embodiment of the present invention. In the embodiment of FIG. 8, supervisory entity 130 includes a supervisory control and data acquisition (SCADA) system 802. SCADA systems typically perform data collection and control at the supervisory level. SCADA system 802 may function as a master system to metering assemblies 302, which may function as slave systems. SCADA system 802 performs data collection with respect to metering assemblies 302, and generates and transmits control signals to metering assemblies 302, such as the signals/commands described elsewhere herein. Supervisory entity 130 may be used to collect status, current, voltage, power, and/or other information from metering assemblies 302. Such information may be used to control metering assemblies 302, to invoice tenants and/or other users of alternate power, and/or for other purposes.

Figure 9:
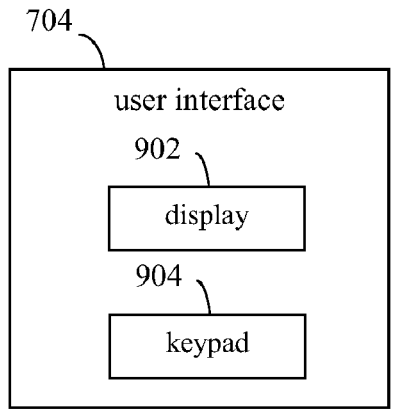
FIG. 9 shows a block diagram of a user interface for a metering assembly, according to an embodiment of the present invention.

Referring back to FIG. 7, user interface 702 provides a human to machine (HMI) interface that enables an operator to interact with metering assembly 302. User interface 702 may include any number and type of user interface elements to enable an operator to input commands to metering assembly 302, to set parameters of metering assembly 302, to check a status maintained by metering assembly 302, and/or to otherwise interact with metering assembly 302. For example, FIG. 9 shows a block diagram of user interface 704, according to an embodiment of the present invention. As shown in FIG. 9, user interface 704 includes a display 902 and a keypad 904. For example, display 902 may be an LCD display, LED display, other type of flatscreen monitor, a CRT monitor, or other display type that enables an operator to view, and optionally to interact with, text and/or graphics. Display 902 may enable display of any number of one or more lines of text at one time. Keypad 904 may include one or more arrow keys, alphanumeric keys, special function keys, and/or any other type and combination of keys to enable an operator to input and/or modify data. In an embodiment, user interface 702 enables operators to login using login identification and/or a password.

Storage 708 may be used to store any desired information for metering assembly 302. For example, in an embodiment, storage 708 may store information, including control parameters, received from supervisory entity 130 and/or user interface 704, and to store power consumption and/or other status and historical information collected/generated by power monitor 714. Storage 702 may provide a buffer for the stored data to enable continued operation of metering assembly 302 if communication with supervisory entity 130 is lost.

Figure 10:
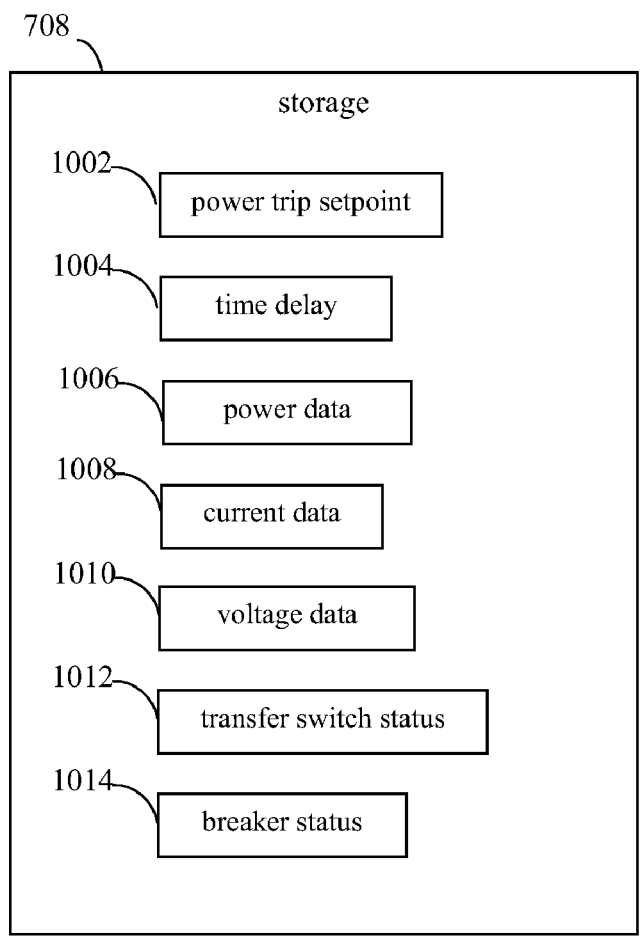
FIG. 10 shows example information that may be stored in storage of a metering assembly, according to an embodiment of the present invention.

For example, FIG. 10 shows example information that may be stored in storage 708, according to an embodiment of the present invention. As shown in FIG. 10, storage 708 may store parameters such as a power trip setpoint 1002 and a time delay 1004. For example, time delay 1004 may be a time delay received from supervisory entity 130 that metering assembly 302 waits before enabling a transfer switch 110, such as during the sequencing of loads described above. Storage 708 may store status/historical information such as power data 1006, current data 1008, voltage data 1010, transfer switch status 1012, and breaker status 1014. A description of each of these elements of stored information is provided below. The status/historical information may be collected by power monitor 714 on a non-periodic or periodic basis. Furthermore, the status/historical information may be retained in storage 708 for any amount of time. For example, values for power data 1006, current data 1008, voltage data 1010, transfer switch status 1012, and breaker status 1014 may be retained in storage 708 for a week, a month, a year, or other time period, and may be periodically uploaded to supervisory entity 130, to be archived, to be used to analyze a performance of alternate power source 104, power consumption by electrical circuit load 112, and/or for other reasons.

Figure 11:
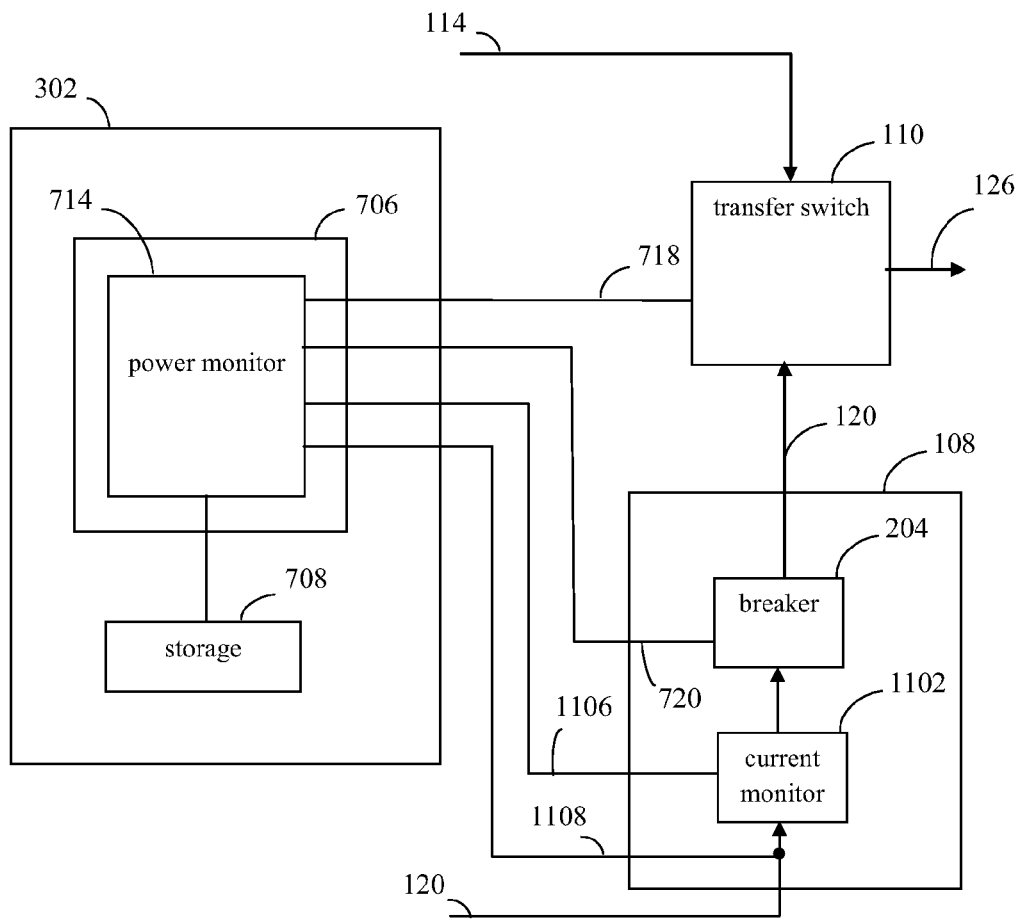
FIG. 11 shows a block diagram illustrating interaction of a metering assembly with a corresponding transfer switch and circuit breaker in a monitoring capacity, according to an example embodiment of the present invention.
Figure 12:
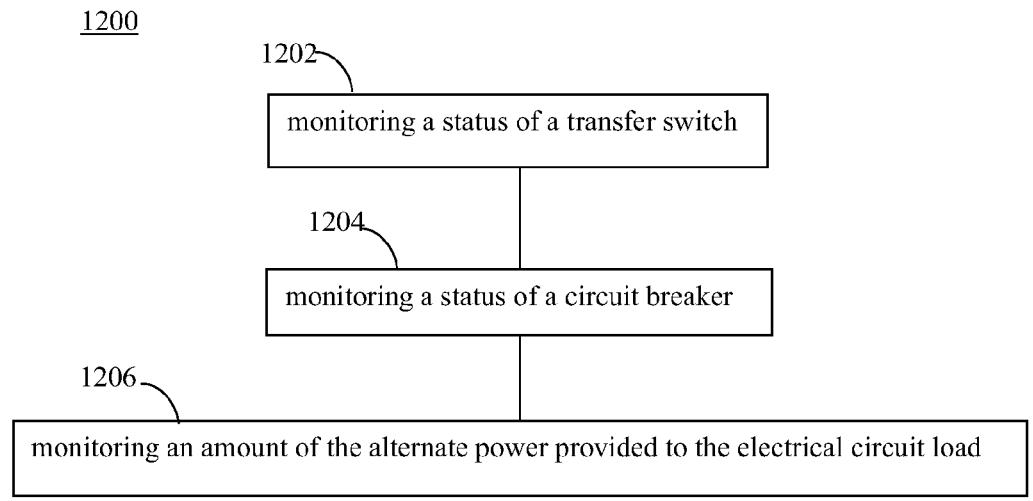
FIG. 12 shows a flowchart illustrating example monitoring that may be performed by a power monitor, according to an embodiment of the present invention.

FIG. 11 shows a block diagram illustrating interaction of metering assembly 302 with a corresponding transfer switch 110 and circuit breaker 204 in a monitoring capacity, according to an example embodiment of the present invention. A portion of metering assembly 302 including power monitor 714 is shown in FIG. 11, for ease of illustration. FIG. 12 shows a flowchart 1200 illustrating a monitoring function that may be performed by power monitor 714, according to an example embodiment of the present invention. Any combination of one or more steps of flowchart 1200 may be performed in embodiments. Flowchart 1200 is described as follows with respect to FIG. 11.

In step 1202 of flowchart 1200, a status of a transfer switch is monitored. For instance, as shown in FIG. 11, power monitor 714 is coupled to transfer switch 110 by communication link 718. Power monitor 714 may receive status information from transfer switch 110 over communication link 718. For example, power monitor 714 may receive a switch status from transfer switch 110 indicating whether transfer switch 110 is in a normal power source mode (e.g., supplying first power signal 114 to electrical circuit load 112) or in an emergency power source mode (e.g., supplying alternate power signal 118 to electrical circuit load 112). The received status information may be stored in storage 708 by power monitor 714 as transfer switch status 1012 shown in FIG. 10. Transfer switch 110 may provide additional and/or alternative status information to power monitor 714 over communication link 718 in further embodiments.

In step 1204, a status of a circuit breaker is monitored. For instance, as shown in FIG. 11, power monitor 714 is coupled to circuit breaker 204 by communication link 720. Power monitor 714 may receive status information from circuit breaker 204 over communication link 720. For example, power monitor 714 may receive a breaker status from circuit breaker 204 indicating whether circuit breaker 204 is in an open (non-conducting) or closed (conducting) position. The received status information may be stored in storage 708 by power monitor 714 as breaker status 1014 shown in FIG. 10. Circuit breaker 204 may provide additional and/or alternative status information to power monitor 714 over communication link 720 in further embodiments.

Figure 13:
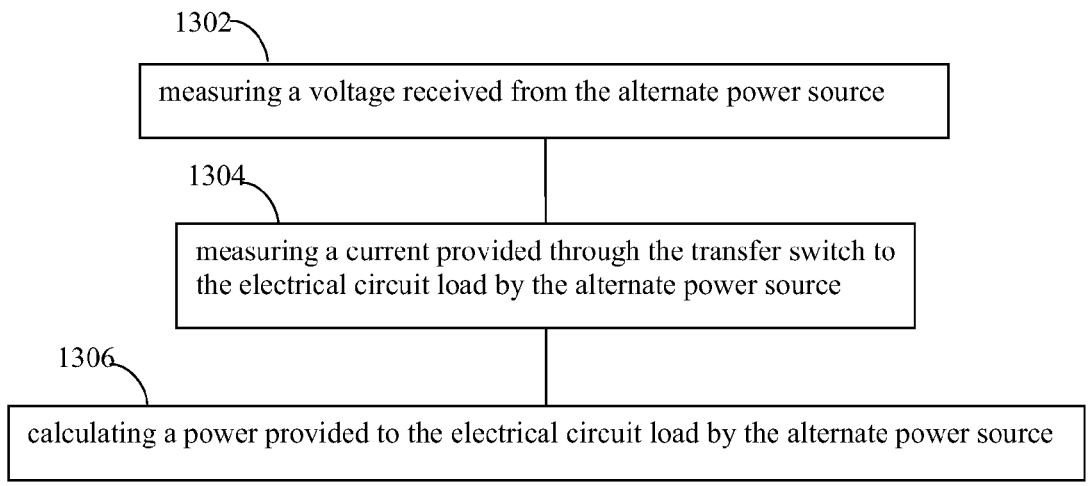
FIG. 13 shows a flowchart illustrating a process for determining an amount of power provided by an alternate power source to an electrical circuit load through a transfer switch, according to an example embodiment of the present invention.

In step 1206, an amount of the alternate power provided to the electrical circuit load is monitored. Power monitor 714 may determine an amount of power provided to electrical circuit load 112 through transfer switch 110 in any manner. For example, in an embodiment, power monitor 714 may perform step 1206 according to a flowchart 1300 shown in FIG. 13. Flowchart 1300 illustrates a process for determining an amount of power provided by alternate power source 104 to electrical circuit load 112 through transfer switch 110, according to an example embodiment of the present invention. Flowchart 1300 is described as follows.

In step 1302, a voltage received from the alternate power source is measured. For example, as shown in FIG. 11, power monitor 714 is coupled to alternate power branch signal 120 by voltage signal 1108. Voltage signal 1108 provides an indication of a voltage of alternate power branch signal 120. Voltage signal 1108 may be coupled to alternate power branch signal 120 in load panel 108 at any location, including in a backplane of load panel 108. Power monitor 714 may include any type of voltage measuring device to measure a voltage of received on voltage signal 1108, including a voltmeter. An indication of the measured voltage may be stored by power monitor 714 in storage 708 as voltage data 1010 shown in FIG. 10.

In step 1304, a current provided through the transfer switch to the electrical circuit load by the alternate power source is measured. For example, as shown in FIG. 11, a current monitor 1102 is coupled in series with alternate power branch signal 120. Power monitor 714 receives a current indication signal 1106 from current monitor 1102. Current monitor 1102 is configured to determine a current of alternate power branch signal 120. Current monitor 1102 generates current indication signal 1106 to provide an indication of the current through current monitor 1102. Current monitor 1102 may include any type of current measuring device, including a current transformer. An indication of the measured current may be stored by power monitor 714 in storage 708 as current data 1008 shown in FIG. 10.

In step 1306, a power provided to the electrical circuit load by the alternate power source is calculated. Power monitor 714 may calculate the power provided to electrical circuit load 112 through transfer switch 110 in any manner, such as in a digital or analog form. Power monitor 714 may calculate the provided power according to P=V×I×PF (for single phase loads) and P=V×I×PF×1.732 (for three phase loads), where P is the calculated power, V is the measured voltage of step 1302, and I is the measured current of step 1304, PF is the power factor calculated from V and I phase angles. Power monitor 714 may calculate the apparent, reactive and/or active power supplied by alternate power source 104 through transfer switch 110. An indication of the calculated power may be stored by power monitor 714 in storage 708 as power data 1006 shown in FIG. 10.

Figure 14:
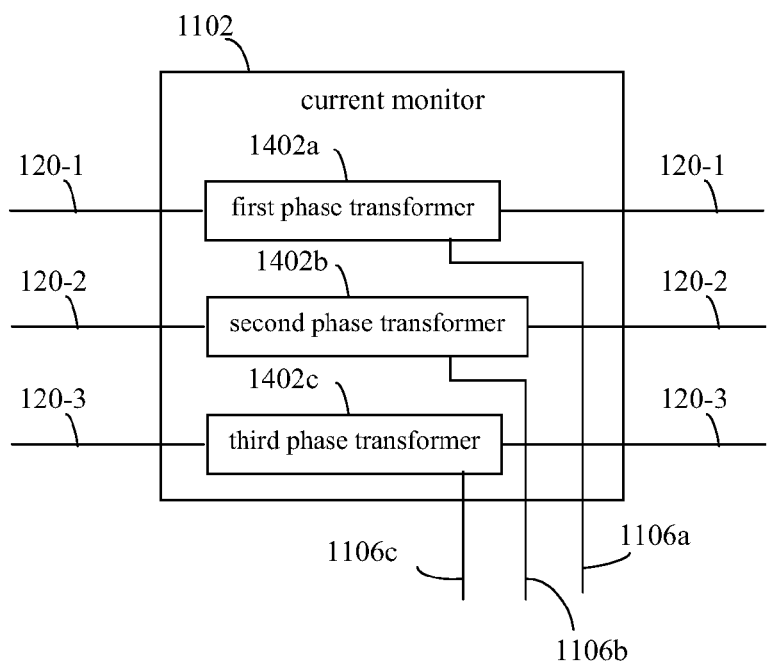
FIG. 14 shows a current monitor configured to measure current through three phases of an alternate power signal, according to an example embodiment of the present invention.

As indicated above, alternate power source 104 may provide DC, single phase, dual phase, three phase, or other configurations of power. In a multi-phase power embodiment, power meter module 706 may have multiple voltage inputs for coupling multiple voltage signals 1108 between power monitor 714 and the various phases of alternate power branch signal 120. Furthermore, current monitor 1102 may have multiple current measuring elements to measure the current of the various phases of alternate power branch signal 120. For example, FIG. 14 shows current monitor 1102 including first-third phase current transformers 1402a-1402c to measure current through first-third phases 120-1, 120-2, and 120-3 of alternate power branch signal 120. Each of current indication signals 1106a-1106c is coupled to a corresponding one of current transformers 1402a-1402c to provide an indication of the current through current monitor 1102 for the respective phase to power monitor 714. Power monitor 714 may calculate a power for each phase, and sum the calculated powers to determine a total provided power.

In an embodiment, metering assembly 302 monitors a power provided to an electrical load 112 through a corresponding transfer switch 110 to determine whether an amount of power in excess of an allowable amount is being consumed by the electrical load 112. For example, an electrical circuit load 112 may be a load provided by a particular tenant residing in a portion 132 of structure 102 (shown in FIG. 1). The tenant may pay an entity, such as an owner/manager of structure 102 to have alternate power source 104 available in the event of loss of first power source 128. However, the tenant may have agreed to use no more than a predetermined amount of the capacity of alternate power source 104, which may be a limited power resource. For instance, the tenant may have agreed to use no more than 400 KiloWatts of a total 1.0 MegaWatts capacity of alternate power source 104 (other tenants may have reserved the remaining 600 KiloWatts of the total capacity). If the tenant exceeds the predetermined amount, the owner/manager of structure 102 may desire to take action to reduce or halt the power consumption by the tenant.

FIG. 15 shows a flowchart 1500 for monitoring power consumption by an electrical circuit load, according to an example embodiment of the present invention. Flowchart 1500 is described as follows.

In step 1502 of flowchart 1500, an entity is enabled to input a power trip setpoint defining an allowable amount of power to be provided to the electrical circuit load by the alternate power source. For example, in an embodiment, an operator of user interface 704 may input a power trip setpoint (e.g., 400 KiloWatts) into metering assembly 302. The power trip setpoint may be a maximum allowable amount of power to be provided to electrical circuit load 112, or may be another power level intended to cause action (e.g., a notification, etc.). Any number of power trip setpoints may be entered into user interface 704 corresponding to various power levels where action is desired. Alternatively, the power trip setpoint(s) may be received from supervisory entity 130. A power trip setpoint may be stored in storage 708 as power trip setpoint 1002, as shown in FIG. 10.

In step 1504, whether an amount of the alternate power provided to the electrical circuit load is greater than the power trip setpoint is determined. For example, FIG. 16 shows an implementation of power control module 712 in metering assembly 302 for performing steps 1504 and 1506, according to an embodiment of the present invention. As described above, power monitor 714 may determine an amount of power provided to electrical circuit load 112 through a transfer switch 110. Power control module 712 may receive the determined amount of power from power monitor 714 or from storage 708 (power data 1006). Power control module 712 may compare the determined amount of power to power trip setpoint 1002, to determine whether the amount of power provided to electrical circuit load 112 by alternate power source 104 is greater than power trip setpoint 1002.

In step 1506, a reduction in the power provided to the electrical circuit load by the alternate power source is enabled. If power control module 712 determines in step 1504 that the amount of power provided to electrical circuit load 112 by alternate power source 104 is greater than power trip setpoint 1002, power control module 712 may enable a reduction (e.g., a partial or complete cutoff) of power from alternate power source 104 to the electrical circuit load 112.

In embodiments, power control module 712 may enable the reduction of power supplied to the electrical circuit load 112 in a various ways. As shown in FIG. 16, transfer switch 110 includes a relay 1604. In an embodiment, power control module 712 may transmit a signal to transfer switch 110 over communication signal 124 to cause relay 1604 to open, to inhibit alternate power signal 118 from being supplied to electrical circuit load 112. In another embodiment, power control module 712 may transmit a control signal over communication link 122 to circuit breaker 204 to open circuit breaker 204. For example, circuit breaker 204 may include a shunt-trip that enables circuit breaker 204 to be opened by a control signal. By opening circuit breaker 204, alternate power branch signal 120 is inhibited from being supplied to electrical circuit load 112. In still another embodiment, power control module 712 may sound an alarm 1612 located internal (as in FIG. 16) or external to metering assembly 302 to alert an operator to notify a tenant associated with electrical circuit load 112 to reduce power consumption or to prepare to have power withdrawn.

In some situations, a total power supplied to electrical circuit loads 112a-112n may approach or begin to exceed a maximum power supply capability of alternate power supply 104. Such as situation could lead to an undesired failure of alternate power supply 104. In an embodiment, supervisory entity 130 may be configured to enable the shedding of one or more of electrical circuit loads 112a-112n to reduce the total load on alternate power supply 104. For example, in an embodiment, supervisory entity 130 may be configured to determine a sum of the amounts of alternate power provided to electrical circuit loads 112a-112n through transfer switches 110a-110n. Supervisory entity 130 may request power data 1006 to be transmitted to supervisory entity 130 from each of metering assemblies 302a-302n. Supervisory entity 106 may sum the entries for power data 1006 received from metering assemblies 302a-302n. If supervisory entity 130 determines that the sum is greater than a maximum allowable output power of alternate power source 104, supervisory entity 130 may select one or more of electrical circuit loads 112a-112n to be shed to reduce power consumption. Supervisory entity 130 may transmit an instruction to one or more metering assemblies 302 corresponding to the selected electrical circuit loads 112 to decouple the selected electrical circuit loads 112 from alternate power source 104. Power control modules 712 corresponding to the selected electrical circuit loads 112 may open circuit breaker 204 or transfer switch 110, in a similar fashion as described above with regard to FIG. 16, to decouple the selected electrical circuit loads 112 from alternate power source 104.

Note that communications links 122, 124, 718, and 720, and communication links that carry signals 1106 and 1108, may be any type of communication links. The communication links may carry communications in analog or digital form. For example, the communication links may each include one or more wires/cables that can supply a voltage (e.g., 5 V, 24 V, etc.) to indicate a particular signal state. A metering assembly 302 may include one or more relays used to make communications by changing signal states (e.g., 5 V, 24 V) on one or more of the communication links.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A metering assembly, comprising:
a power meter module that includes a power control module, wherein the power control module is communicatively coupled to a transfer switch, wherein the transfer switch has a first input terminal coupled to a source of a first power, a second input terminal coupled to a source of an alternate power, and an output terminal coupled to an electrical circuit load, the transfer switch is configured to transmit a request to the power control module for the alternate power to be supplied through the transfer switch to the electrical circuit load in response to sensing failure of the first power,
wherein the power control module is configured to receive the request from the transfer switch for the alternate power to be supplied through the transfer switch to the electrical circuit load,
wherein the power control module is configured to enable the transfer switch to supply the alternate power to the electrical circuit load in response to the request; and
a communication interface coupled to the power meter module and configured to communicate with a supervisory entity that is communicatively coupled to a plurality of power meter modules of corresponding metering assemblies, wherein the power meter modules are communicatively coupled to a plurality of transfer switches and the transfer switches are coupled to a plurality of electrical circuit loads;
wherein the supervisory entity is configured to determine an order in which to enable the plurality of transfer switches to supply the alternate power to the plurality of electrical circuit loads in the event of loss of the first power and the power control module receives timing information from the supervisory entity through the communication interface; and
wherein the power control module transmits a signal to the transfer switch based on the received timing information to enable the alternate power to be supplied to the electrical circuit load according to the determined order.

2. The metering assembly of claim 1, wherein the transfer switch is a break before make type switch configured to switch the output terminal from the first input terminal to the second input terminal in the event of a loss of the first power when enabled by the power control module.

3. The metering assembly of claim 1, wherein each of the plurality of electrical circuit loads is distributed through a corresponding portion of a building, wherein the source of the first power is an electric utility, and wherein the source of the alternate power is located in the building.

4. The metering assembly of claim 1, wherein the power meter module further comprises a power monitor coupled to the power control module;
wherein the power monitor is configured to determined an amount of the alternate power provided to the electrical circuit load;
wherein the power control module is configured to compare the determined amount of
alternate power provided to the electrical circuit load to a power trip setpoint; and
wherein the power control module is configured to enable the alternate power to be decoupled from the electrical circuit load if the power monitor determines that the amount of the alternate power provided to the electrical circuit load is greater than the power trip setpoint.

5. The metering assembly of claim 4, wherein the power control module is configured to transmit a signal to a circuit breaker coupled between the transfer switch and the source of the alternate power to open the circuit breaker to decouple the alternate power from the electrical circuit load.

6. The metering assembly of claim 4, wherein the power control module is configured to transmit a signal to the transfer switch to inhibit the alternate power from being supplied to the electrical circuit load to decouple the alternate power from the electrical circuit load.

7. The metering assembly of claim 4, wherein the power monitor is configured to measure a voltage received from the alternate power source, to measure a current provided through the transfer switch to the electrical circuit load, and to calculate the amount of power provided to the electrical circuit load based on the measured voltage and the measured current.

8. The metering assembly of claim 7, wherein the power monitor is configured to calculate the amount of power provided to the electrical circuit load for single and three phases of power supplied by the alternate power source.

9. The metering assembly of claim 4, further comprising:
a user interface configured to enable an operator of the metering assembly to determine the power trip setpoint; and
a storage device;
wherein the storage device is configured to store the determined power trip setpoint.

10. The metering assembly of claim 1, wherein the supervisory entity is configured to determine a sum of the amounts of alternate power provided to the plurality of electrical circuit loads through the transfer switches; and
wherein the power control module is configured to enable the alternate power to be decoupled from the electrical circuit load according to a received instruction from the supervisory entity if the supervisory entity determines that the sum is greater than a maximum allowable output power of the alternate power source.

11. The metering assembly of claim 1, further comprising:
a display coupled to the power meter module;
a keypad coupled to the power meter module;
a storage device coupled to the power meter module; and
a housing that contains the power meter module, the storage device, and the communication interface, and that mounts the display and the keypad.

* * * * *